United States Patent [19]

Mego et al.

[11] Patent Number: 4,636,813

[45] Date of Patent: Jan. 13, 1987

[54] THERMAL PRINT HEAD

[75] Inventors: Kazuyoshi Mego; Shigetoshi Hiratsuka; Eiichi Hara, all of Yokohama, Japan

[73] Assignee: Hitachi, Ltd., Tokyo, Japan

[21] Appl. No.: 792,280

[22] Filed: Oct. 28, 1985

[30] Foreign Application Priority Data

Oct. 29, 1984 [JP] Japan .............................. 59-225931

[51] Int. Cl.[4] ............................................ G01D 15/10

[52] U.S. Cl. .......................... 346/76 PH; 346/139 L; 338/309; 219/543

[58] Field of Search .................. 346/76 PH; 338/307, 338/309; 174/68.5; 219/216 PH, 543; 357/70; 339/17 L, 17 LC, 17 LM, 17 C, 17 LF; 361/403, 404, 406

[56] References Cited

U.S. PATENT DOCUMENTS 4,252,991 2/1981 Iwabushi ............................ 361/406

*Primary Examiner*—Arthur G. Evans

*Attorney, Agent, or Firm*—Antonelli, Terry & Wands

[57] ABSTRACT

The lead wires extending from heating resistors to a driver IC for the heating resistors are arranged in the space under the driver IC. These lead wires are constructed in that they become narrower in wire width as approaching the driver IC so as to lie within the width of the driver IC, and the lead wires positioned under the driver IC are constructed in that they become broader in wire width as approaching the connecting terminals of the driver IC. Connection of the lead wires and the driver IC is carried out by the face-down bonding using Controlled Collapse Bonding.

By providing the construction as mentioned above, a thermal print head of higher density and definition can be obtained.

10 Claims, 3 Drawing Figures

THERMAL PRINT HEAD

BACKGROUND OF THE INVENTION

The present invention relates to a thermal print head, particularly to packaging of the elements of a thermal print head.

The thermal print system is widely adopted in facsimile and printers. Thermal print means a system in which Joule heat is given to a printing medium such as heat-sensitive paper and plain paper through ink sheet (transcription paper) by heating elements (heating resistors) to cause direct color development or fusion thereby to perform transcriptional print.

A thermal print head usually comprises a plurality of heating elements disposed in a line on a ceramic substrate, and each heating element is heated by the electric current corresponding to a picture signal.

A Japanese Patent Laid-Open No. 31778/1983 discloses an example of the construction of such a thermal print head.

The thermal print head which has been known up to date, as shown in FIG. 2 of the above Patent Laid-Open No. 31778/1983, has a construction that the driver IC's for the heating resistors (driver IC's) are packaged on a ceramic substrate by the so-called face-up packaging so that the face having the connecting terminals takes the upside position, and the connecting terminals provided on the lead wires from the heating resistors are wire-bonded to the connecting terminals of the driver IC's by gold or aluminum wires.

In recent years, printed pictures of high definition having 8 lines/mm or more resolution have been required, and miniaturization of the print head itself has also been required. In this situation, it is necessary to densely package the electic elements constituting the print head, but there is a limit in the above-mentioned conventional construction. That is, to perform wire bonding, the distance between the connecting terminals needs to be at least 1 mm or so in view of the nature of the work, and even if the driver IC can be miniaturized, this space for wire bonding cannot be reduced. In addition, if the lead wires from the heating resistors are made narrower and thinner, electric resistance will increase and the fluctuation of resistance due to the differences in wire length cannot be ignored. Further, fall of the production yield due to pattern defects in the manufacture process is inevitable.

SUMMARY OF THE INVENTION

The object of the present invention is to provide a thermal print head that can realize printed pictures of high definition.

A further object of the present invention is to provide a miniaturized thermal print head.

A still further object of the present invention is to provide a thermal print head in which the fluctuation of characteristics of the heating resistors and the driver circuit thereof mainly due to the fluctuation of electric resistance of the wires is eliminated.

A still further object of the present invention is to provide a thermal print head of high production yield.

In the present invention, the lead wires extending from the heating resistors to the driver IC for the heating resistors are not disposed around the driver IC, instead they are all disposed so as to be positioned under the driver IC. In addition, these lead wires are constructed in that they become narrower in wire width as approaching from the heating resistors to the driver IC so as to lie within the width of the driver IC, and the lead wires positioned under the driver IC are constructed in that they become broader in wire width as approaching the connecting terminals of the driver IC. The connection of the lead wires constructed in this way with the driver IC is achieved by the so-called face-down bonding, in which the connection is performed by the CCB (Controlled Collapse Bonding) method with the face of the driver IC having the connecting terminals being directed toward the substrate.

DETAILED DESCRIPTION OF THE INVENTION

Figure 1:
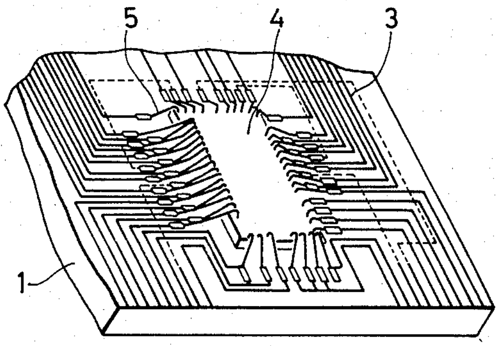
FIG. 1 PRIOR ART
FIG. 1 is a perspective view of the driver IC mounting portion of the thermal print head according to the prior art.

FIG. 1 is a perspective view of the driver IC mounting portion of a thermal print head for showing the method of connecting the lead wires from the heating resistors and the heating resistor driver IC according to the prior art.

The lead wires 3 from the heating resistors provided on a ceramic substrate 1 are drawn around a driver IC 4. Connection of the lead wires 3 with the driver IC 4 is achieved by wire bonding using wires 5. According to such prior art, it is necessary to ensure the space for wire bonding, and, thus, it is apparent that there is a limit in packaging driver IC's at a high density.

Figure 2:
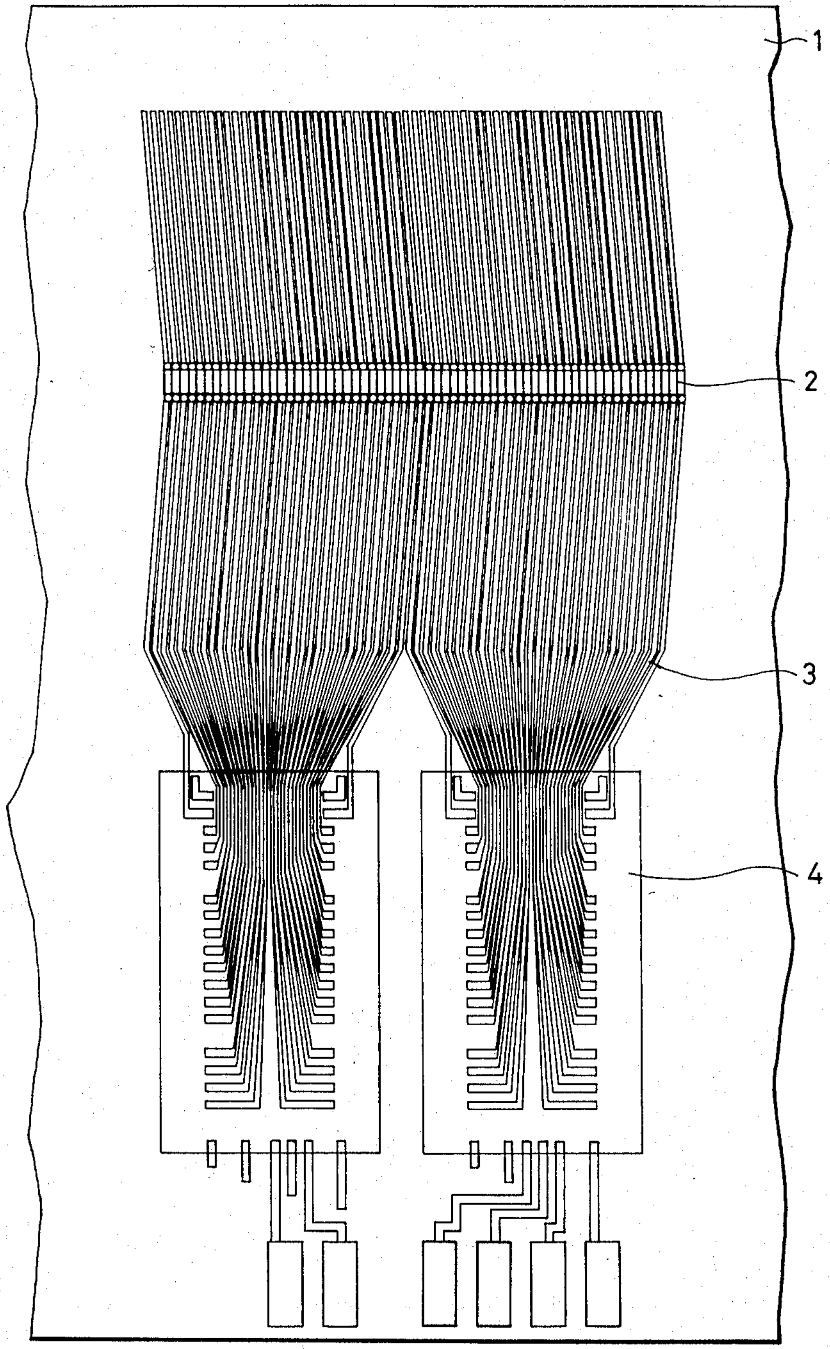
FIG. 2 is a plan view showing the thermal print head according to the present invention.

FIG. 2 is a plan view showing the thermal print head according to the present invention. In the figure, except the heating resistors, the lead wires from the heating resistors and the driver IC mounting portions, various wires actually provided are omitted.

Electric elements and wires such as heating resistors 2 and lead wires 3 are provided on a substrate 1. The substrate 1 is usually made of ceramics having a thickness on the order of 1-1.5 mm. A large number of heating resistors 2 are arranged in a line so that they extend over the full width of a thermal print paper passing the thermal print head. For instance, when printing is carried out on a B4-size print paper (the paper width: 256 mm) at a density of 8 lines/mm, 2048 heating resistors are needed if they are arranged at intervals of 125 $\mu$m. Since the whole cannot be shown in the figure, only 64 of them are shown. These heating resistors 2 can be constructed by a known material of the Cr-Si system, and they are patternized on a ceramic substrate by photolithography.

The lead wires 3 are drawn from the respective heating resistors 2 at a same interval. The lead wires 3 are aluminum and are patternized by photolithography in a way similar to that for the heating resistors 2. The lead wires 3 may be made of a material other than aluminum, for instance, gold.

Figure 3:
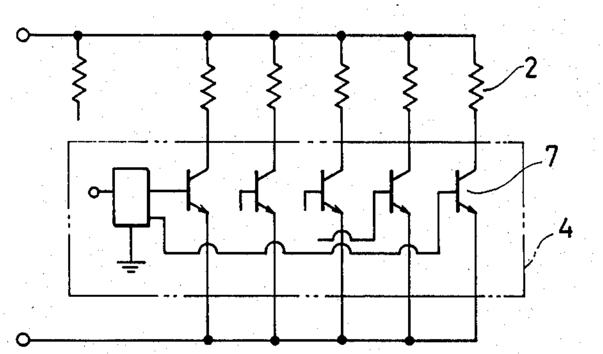
FIG. 3 is a circuit diagram showing the heating element driver circuit.

The driving of the heating resistors 2 is carried out by a heating element driver circuit as shown in FIG. 3. Switching transistors 7 are respectively connected for each of the heating resistors 2, and, usually, as these switching transistors 7 and other driver circuits which are not shown, those which are integrated into an integrated circuit as a heating resistor driver IC are used. If this driver IC contains 32 switching transistors 7, it will have a width on the order of 1.8 mm. Since the switching transistors 7 respectively correspond to each of the heating resistors 2, a total of 64 driver IC's each containing 32 switching transistors as described above are needed in order to drive 2048 heating resistors for a B4-size print paper. In the present invention, the arrangement of these driver IC's 4 and the connection of the lead wires 3 from the heating resistors 2 with the driver IC's 4 are constructed as follows.

That is, a driver IC 4 is disposed on the ceramic substrate 1 in parallel with the heating resistors 2, as shown in FIG. 2. The lead wires 3 are narrowed as approaching the driver IC 4 so as to lie within the width of the driver IC. Namely, as shown in FIG. 2, the lead wires 3 arranged at intervals of 125 μm are narrowed as approaching the driver IC till they are arranged at intervals of 55 μm, all the lead wires 3 are positioned under the driver IC 4. The lead wires 3 narrowed in this way are radially arranged under the driver IC toward the connecting terminals provided around the driver IC. On this occasion, the lead wires 3 are constructed so as to become broader in wire width toward the end thereof as well as radially arranged at an appropriate angle from the linear portion thereof. By making the width of the wires broader toward the end of the wires in this way, the fluctuation of electric resistance of the wire conductors becomes small, whereby the voltage drop is compensated. Namely, the fluctuation of driving characteristic of each heating resistor can be eliminated. In addition, by broadening the wire width, breaking of wire or the like becomes difficult to occur.

The end of the lead wires 3, or the portion to be connected to the driver IC 4 is provided with a pedestal for connecting the driver IC by Controlled Collapse Bonding (CCB) as described later. The pedestal may be constructed, for instance, by lamination of Cr, Cu and Au thin films. The driver IC 4 is applied with the so-called face-down, which means that the face having the connecting terminals opposes the substrate, and alignment is provided so that the connecting terminals are positioned above the above-mentioned pedestals. Then, they have only to be solder-welded in a furnace of $N_2$ gas atmosphere to complete Controlled Collapse Bonding.

What is claimed is:

1. A thermal print head comprising a first substrate, heating resistors provided on the first substrate, driver element means for driving the heating resistors, the driving element means including a second substrate of a predetermined width and having connecting terminals on one surface thereof, and lead wires for connecting the heating resistors and the connnecting terminals of the driver element means, the lead wires being arranged on the first substrate so that the driver element means is mounted thereover, the lead wires extending from the heating resistors at one portion of the first substrate to another portion of the first substrate for the mounting of the driver element means thereat, the lead wires being arranged so as to lie within the width of the second substrate of the driver element means upon approaching the driver element means so as to enable the driver element means to be mounted thereon.

2. A thermal print head according to claim 1, wherein the lead wires are arranged so that the lead wires become narrower in wire width and the wiring density of the lead wires becomes greater in the region proximate to the another portion of the first substrate approaching the driver element means than at the one portion of the first substrate.

3. A thermal print head according to claim 2, wherein portions of the lead wires positioned at the another portion of the first substrate so as to have the driver element means mounted thereon become broader in wire width at connecting portions than the narrow wire width thereof for enabling connection at the connecting portions to the connecting terminals of the driver element means.

4. A thermal print head according to claim 3, wherein the connecting portions of the lead wires enabling connection to the connecting terminals of the driver element means are end portions of the lead wires.

5. A thermal print head according to claim 1, wherein the driver element means comprises switching means, the connecting terminals of the switching means being provided on the one surface of the second substrate and arranged so that the driver element means is face-down connected to the lead wires.

6. A thermal print head according to claim 5, wherein driver element means is face-down connected to the lead wires by Controlled Collapse Bonding.

7. A thermal print head according to claim 5, wherein the switching means comprises switching transistors.

8. A thermal print head according to claim 4, wherein the driver element means comprises switching means, the connecting terminal of the switching means being provided on the one surface of the second substrate and arranged so that the driver element means is face-down connected to lead wires.

9. A thermal print head according to claim 8, wherein driver element means is face-down connected to the lead wires by Controlled Collapse Bonding.

10. A thermal print head according to claim 8, wherein the switching means comprises switching transistor.

* * * * *